United States Patent Office 3,733,352
Patented May 15, 1973

3,733,352
PREPARATION OF D-THREO-1-p-METHYL-
SULFONYLPHENYL - 2-DICHLORO-ACET-
AMIDOPROPANE-1,3-DIOL
Hisao Akiyama, Nishinomiya-shi, Hisao Tobiki, Toyo-
naki-shi, Toru Mitani, Nishinomiya-shi, Yasuharu
Miura, Ikeda-shi, and Hiroyuki Suzuki, Takarazuka-
shi, Japan, assignors to Sumitomo Chemical Company,
Ltd., Higashi-ku, Osaka, Japan
No Drawing. Filed July 23, 1969, Ser. No. 844,206
Int. Cl. C07c *147/10*
U.S. Cl. 260—470
5 Claims

ABSTRACT OF THE DISCLOSURE p-Methylsulfonylbenzaldehyde (2 moles) is reacted with an alkali metal salt of glycine (1 mole) in an alcohol in the presence of an alkali metal carbonate, and the thus obtained β-p-methylsulfonylphenylserine is reacted with an alcohol in the presence of an acid to give an ester of optically inactive threo-β-p-methylsulfonylphenylserine. This optically inactive ester is optically resolved with d-tartaric acid. D-form ester thereof is reduced by calcium chloride and sodium borohydride, and the thus obtained calcium salt of D-threo-1-p-methylsulfonylphenyl-2-amino-1,3-propane-dial boron complex is contacted with an alkali metal cyanide and chloral in water to obtain thiamphenicol. Further, the L-form threo ester obtained by the optical resolution can easily be racemized when hydrolyzed and then heated at 30°–150° C. at pH 8–11.

The present invention relates to an industrial process for producing thiamphenicol useful as microbicides. More particularly, it releates to an industrially advantageous process for producing thiamphenicol represented by the following reaction scheme:

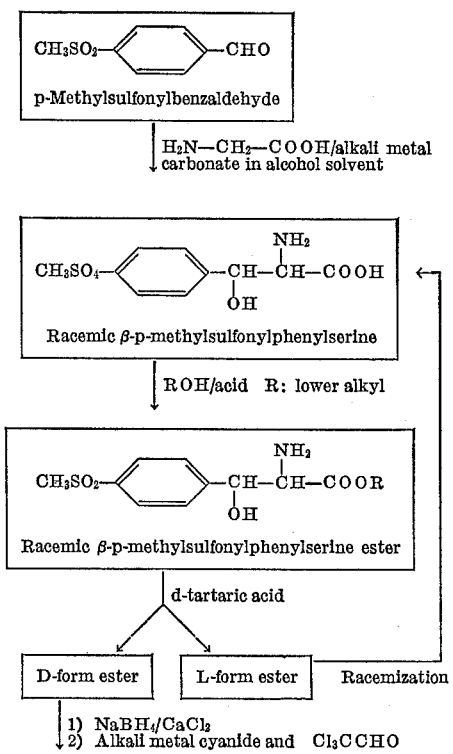

1) NaBH₄/CaCl₂
2) Alkali metal cyanide and Cl₃CCHO

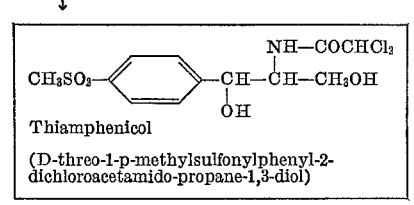

Thiamphenicol
(D-threo-1-p-methylsulfonylphenyl-2-
dichloroacetamido-propane-1,3-diol)

Of thiamphenicol, only the D-threo form possesses excellent microbioidal activity, but other isomers, i.e., L-threo, D-erythro and L-erythro forms possess extremely weak microbicidal activity.

Several conventional processes for preparing thiamphenicol are known heretofore (for example, J. Am. Chem. Soc., 74, 5495 (1952), ibid 75, 4330 (1953), British Patent 745,900, U.S. Pat. 2,721,207 and U.S. Pat. 2,726,-266, etc.). However, these processes employ p-methylsulfonylacetophenone or p-methylthioacetophenone as a starting material. U.S. Pat. 2,816,915 discloses a process for producing DL-thiamphenicol from p-methylsulfonylbenzaldehyde using as a starting material. This process may be described by the following formula:

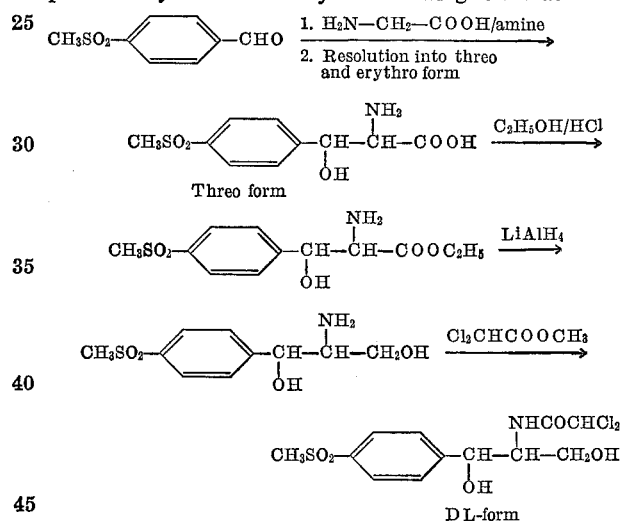

The U.S. patent process, however, includes the following defects, and is not industrially advantageous.

(1) In order to obtain threo-form of p-methylsulfonylphenylserine by condensation of p-methylsulfonylbenzaldehyde with glycine, relatively expensive chemicals such as triethylamine, copper acetate, acetonitrile, etc. must be used and complicated steps must be passed through. In addition, the yield of the pure product based on glycine is extremely low, that is, 25% at its maximum.

(2) The reactions for the preparation of DL-thiamphenicol from a threo-p-methylsulfonylserine ester employs a reagent which is expensive and difficult to handling, such as LiAlH₄, and requires the troublesome steps.

(3) The end product obtained is in DL-form, and in order to obtain highly microbicidal D-form, the optical resolution must be further carried out.

The present inventors have studied an industrially advantageous process for producing thiamphenicol from p-methylsulfonylbenzaldehyde as a starting material, and as the result, have found that the above-mentioned reaction scheme makes this process possible. That is, the present inventors have found that:

(1) Threo-rich p-methylsulfonylphenylserine may be produced industrially advantageously by preparing an alcoholic solution of alkali metal salt of glycine, adding two times mole of p-methylsulfonylbenzaldehyde per mole of glycine to the said solution, and using an alkali metal carbonate as a condensing agent.

(2) The D-form ester may easily be obtained by esterifying DL - threo - p - methylsulfonylphenylserine, reacting the thus prepared ester with d-tartaric acid in a solvent, filtering the precipitated crystals, and dissolving the said crystals in water and neutralizing the solution thereof with a caustic alkali solution or ammonia water.

(3) An optically active L-threo-β-p-methylsulfonylphenylserine ester recovered from the mother liquor of the above-mentioned D-form ester can easily be converted to an optically inactive threo-β-p-methylsulfonylphenylserine and recycled to be used.

(4) Thiamphenicol may easily be obtained by reducing D-threo-p-methylsulfonylphenylserine ester with sodium borohydride in ethanol solvent in the presence of calcium chloride, and then, without separating the complex, reacting it with an alkali metal cyanide and trichloroacetaldehyde.

The object of the present invention resides in the presentation of an industrially advantageous process for the production of thiamphenicol.

The present invention is described in the order of reaction scheme as follows.

(1) The preparation of threo-β-p-methylsulfonylphenylserine p-Methylsulfonylphenylserine prepared according to the present process has higher threo-form content than that of U.S. Pat. 2,816,915, and can be used for the following step without any purification. Alternatively, if necessary, it may be purified at this step.

The mode of the process of the present invention is explained as follows: Glycine is dissolved in a lower alcoholic solvent and neutralized by adding a calculated amount of alkali metal hydroxide, carbonate, or bicarbonate so as to give a solution of alkali metal salt of glycine. For the neutralization, potassium hydroxide is preferably used. The two times mole of p-methylsulfonylbenzaldehyde per one mole of glycine and alkali metal carbonate such as potassium carbonate as a condensation catalyst are added thereto so as to carry out the condensation reaction. After the completion of reaction, hydrochloric acid is added to the reaction mixture to acidify the same, the precipitated p-methylsulfonylbenzaldehyde is recovered by filtration and then the filtrate is neutralized by an alkali or ammonia so as to obtain the crystals of p-methylsulfonylphenylserine.

As the reaction solvent, alcohols may be used, preferably, lower alcohols such as methanol and ethanol.

The reaction temperature and reaction time depend upon the solvent used. When methanol is used, the reaction completes in 10 to 30 hours at a temperature of 0 to 10° C. Temperature of 15° C. or higher induces deep coloration and decrease in the yield. Higher temperature is required when ethanol is used, i.e. 20° to 50° C., but the time is sufficient as long as 10 hours.

p-Methylsulfonylbenzaldehyde, recovered from hydrochloric acid medium after the condensation reaction, weighs about a half of the initial charge, that is, quantitatively, and may be used for another batch of the reaction without any purification.

The present process is more advantageous over that of U.S. Pat. 2,816,915 with respect to the reaction assisting agent, procedure, yield and quality of threo-β-p-methylsulfonylphenylserine. The present process is extremely valuable as an economical process for producing threo-β-p-methylsulfonylphenylserine with ease and with a good yield.

(2) Esterification of threo-β-p-methylsulfonylphenylserine

Esterification of threo-β-p-methylsulfonylphenylserine, in general, is carried out in the following procedure. Such a lower alcohol as methanol, ethanol or n-butanol is saturated with hydrogen chloride gas, then threo-β-p-methylsulfonylphenylserine is added thereto, and the mixture is heated to effect the esterification. On the completion of esterification, the reaction mixture is cooled and the precipitated hydrochloric acid salt of threo-β-p-sulfonylphenylserine ester is collected by filtration. This hydrochloric acid salt is dissolved in water and is neutralized, while cooling, with sodium carbonate, ammonia water or others to obtain threo-β-p-methylsulfonylphenylserine ester.

Concentrated sulfuric acid, methane-sulfonic acid, p-toluene-sulfonic acid, etc. can be used as the acid catalyst for the esterification, as well as hydrogen chloride gas. Concentrated sulfuric acid is the most preferable from an industrial point of view. The amount of the acid catalyst, for example, in the case of concentrated sulfuric acid, must be 1 to 3 weight times as much as that of threo-β-p-methylsulfonylphenylserine.

The solution containing the acid salt of ester need not be filtered for purification in general, but, when threo-β-p-methylsulfonylphenylserine used contains an extremely small amount of the erythro form and other impurities, the erythro form can be removed by filtering the said solution.

(3) Optical resolution or DL-threo-β-p-methylsulfonylphenylserine ester

DL - threo-β-p-methylsulfonylphenylserine ester obtained in the above-mentioned manner is contacted with d-tartaric acid in a solvent. The separated crystals are filtered off and then dissolved in water. By neutralizing the thus obtained aqueous solution with a caustic alkali solution or ammonia water, the D-form ester may easily be obtained.

The solvent, which may be used for the formation of d-tartaric acid salt in the present invention, includes widely common organic solvents in either hydrous or anhydrous state, but particularly, the use of such a lower alcohol as methanol, ethanol, isopropanol or the like is preferred. Undoubtedly, the larger the difference in solubility between the salts of enantiomers, the more effective the optical resolution is.

The study of the present inventors has clarified that the said difference in solubility depends considerably on the combination of an ester and a solvent. For example, the following interesting facts have been found out: In the case of the ethyl ester, the use of methanol results in the most effective resolution; and with respect to ethanol, 95% hydrous ethanol is most effective and when ethanol having a higher or lower water content than that is used, the resolution efficiency is lowered. Even if the difference in solubility is not so large, the object of the optical resolution can be attained by repeating the steps of salt formation and salt decomposition.

The formation of d-tartaric acid salt is carried out at any temperature between room temperature and the boiling point of the solvent therefor, though the higher the temperature, the faster the formation of the salt and the shorter the reaction time.

The amount of d-tartaric acid used is most preferably equimolar to that of the DL-form ester. The use of an excess of d-tartaric acid does not increase the resolution efficiency at all.

The D-form ester-d-tartaric acid salt filtered off from the reaction mixture may be used without being decomposed as the starting material in the subsequent reaction. In the case of isolating a D-threo-β-p-methylsulfonylphenylserine ester, however, the said ester-d-tartaric acid salt is dissolved in water, the pH of the resulting aqueous solution is adjusted to a value of 8 to 9 with an aqueous caustic alkali solution or ammonia water and the D-form ester separated thereby is collected by filtration.

The solvent is distilled off from the filtrate, from which D-form ester-d-tartaric acid salt has been filtered off, the resulting residue is dissolved in water and the pH of the resulting aqueous solution is adjusted to a value of 8 to 9 with an aqueous caustic alkali solution or ammonia water, whereby crystals of L-threo-β-p-methylsulfonylphenylserine ester are obtained.

(4) The reduction of D-threo-β-p-methylsulfonylphenylserine ester

In accordance with the present invention, D-threo-1-p-methylsulfonylphenyl-2-amino-1,3-propane-diol may be easily prepared by reducing D-threo-β-p-methylsulfonylphenylserine ester with sodium borohydride in a solvent in the presence of calcium chloride.

The reaction solvent of the present process includes alcohols and ethers, preferably alcohols. More preferably, anhydrous alcoholic solvent may be used. The amount of sodium borohydride to be used is 0.6 to 1.0 time by mole as much as that of the starting ester so as to sufficiently carry out the reaction. Further, in case calcium chloride is used in equal mole to that of sodium borohydride, the reaction much preferably proceeds.

In the present process, with respect to reaction condition, the reaction, in general, should be carried out at a low temperature, i.e., $-30°$ to $10°$ C. due to the unstability of $Ca(BH_4)_2$ formed from $NaBH_4$ and $CaCl_2$. In case of a reaction temperature $-20°$ C., the reaction is completed in about 20 hours. On completion of the reaction, by filtering off the precipitated sodium chloride and concentrating the filtrate under reduced pressure, powdery crude calcium salt of D-threo-1-p-methylsulfonylphenyl-2-amino-1,3-propane-diol-boron complex can be obtained. This powdery salt, without purification, may be used for the following step, that is, the dichloroacetylation reaction.

(5) The preparation of thiamphenicol from calcium salt of D-threo-1-p-methylsulfonylphenyl-2-amino-1,3-propane-diol-boron complex The powdery crude calcium salt of D-threo-1-p-methylsulfonylphenyl-2-amino-1,3-propane-diol-boron complex obtained by the above-mentioned manner is dispersed in water; such alkali metal cyanide as sodium cyanide is added thereto, then chloral is added thereto to carry out the reaction; then the reaction mixture is acidified by diluted hydrochloric acid; and consequently, thiamphenicol may be obtained in a high yield. The suitable amount of alkali metal cyanide to be used, is 1 to 2 times by mole as much as that of the ester used. With respect to chloral, either hydrous or anhydrous chloral may be used. In case chloral is used in an amount of 1 to 2 times by mole as much as that of the ester used, the reaction proceeds preferably. With respect to the reaction temperature of the dichloroacetylation step, the reaction may be carried out at an arbitrary temperature of from room temperature to the boiling point of the solvent used, but the employment of a temperature of 35 to 40° C. is preferable. The reaction time depends on the reaction temperature. For instance, at a temperature of 35 to 40° C. the reaction is completed in 2 hours. The acidification by diluted hydrochloric acid after the completion of the reaction should be achieved at a low temperature of 10° C. or below in view of the crystallization and the generation of hydrogen cyanide gas.

If the above-mentioned reaction conditions are chosen, the yield of thiamphenicol based on D-threo-β-p-methylsulfonylphenylserine ester attains to 90%.

(6) Racemization of optically active threo-β-p-methylsulfonylphenylserine ester

Heretofore, method for racemization of optically active threo-phenylserine derivatives has not been disclosed in any literature except that in Acta. Chim. Hung., 17, 449 (1958), wherein optically active methyl ester of threo-β-p-nitrophenylserine was heated at 80° C. in a 50% aqueous ethanol for a short time. However, in this method, the formation of erythro-form together with that of threoform cannot be avoidable because of two asymmetric carbon atoms in the molecule, and yield of the optically inactive methyl ester of threo-β-p-nitrophenylserine is very low. The present inventors studied concerning reaction conditions such as reaction temperature, reaction time, solvent and the like with the intention of obtaining an optically inactive threo-β-p-methylsulfonylphenylserine ester by applying this method to racemization of the optically active ester, but were unsuccessful in the racemization due to the formation of erythro form and low yield of the objective DL-threo form.

On the contrary, as a result of our various investigations, we have found a novel and advantageous method for the racemization of optically active threo-β-p-methylsulfonylphenylserine esters in a high yield without formation of etrythro-form.

In accordance with the present invention, optically active threo-β-p-methylsulfonylphenylserine ester is contacted with water, in the presence of a basic or an acidic substance, to be hydrolyzed; by heating the thus obtained solution, of which pH value is within 8 to 11 inclusively, to a temperature of 30 to 150° C., the racemization is achieved; and consequently optically inactive threo-β-p-methylsulfonylphenylserine can be obtained. Basic substances of this process used for the hydrolysis of the ester includes such an alkali metal hydroxide as sodium hydroxide and such an alkaline earth metal hydroxide as calcium hydroxide, and acidic substances included such as hydrochloric acid. The hydrolysis may be conducted either while cooling, at room temperature or while heating, but conducted the most preferably at room temperature. The solvents to be employed include water and a mixed solvent of water with such lower alcohols miscible with water as methanol and ethanol.

It is critical for the present invention to control the pH value of the solution when racemization is effected. That is, at a pH value less than 8, the racemization is difficult to occur, but at a pH value more than 11, the decomposition reaction takes place so that the yield of the DL-threo form decreases extremely and the formation of by-product increases. Thus, the pH value of the solution should be from 8 to 11 inclusively when the racemization is effected. Moreover, when the racemization is effected the presence of such a divalent metal ion as calcium, magnesium and copper in the solution further promotes the racemization.

The basic substance required for this pH adjustment includes carbonates of alkali metals and alkaline earth metals, ammonia, etc. in addition to the above-mentioned basic substances. The acidic substance for this purpose includes such a mineral acid as hydrochloric acid and sulfuric acid and such an organic acid as acetic acid.

The racemization is generally carried out by heating to a temperature of 30 to 150° C. the solution which is adjusted the pH by such a substance as given above, and most preferably, the temperature of racemization is within from 70 to 100° C. from the industrial point of view. The heating for about 10 to 30 minutes at 150° C. completes the racemization, but the heating requires the use of autoclave.

The reaction mixture treated in this manner is neutralized by such a mineral acid as hydrochloric acid or sulfuric acid or by such an organic acid as acetic acid to the pH value of 3 to 4, and is cooled. The crystals separated are filtered, and washed with water and then with acetone. Consequently, optically inactive threo-β-p-methylsulfonylphenylserine can be obtained.

It is clarified that, the racemization is promoted by such a process in which a DL-amino acid such as DL-threo-β-p-methylsulfonylphenylserine is added to the solution after the hydrolysis, pH value is adjusted and thereafter the mixture is heated. In this case, the amount by mole of addition of DL-amino acid should be equivalent to or more than that of optically active threo-β-p-methylsulfonylphenylserine ester, and consequently, the yield of racemization is improved. Even if equivalent moles or less of DL-amino acid is added, the racemization proceeds but the yield of racemization more or less decreases.

In the same manner, when instead of optically active D or L threo-$\beta$-p-methylsulfonylphenylserine ester, such an optically active organic acid salt of the said ester as d-tartarate, L-aspartate and d-camphor-sulfonate, such an optically active mineral acid salt of the said ester as hydrochloride or a lower alcohol solution containing these salts is treated in the above-mentioned manner, threo-$\beta$-p-methylsulfonylphenylserine may be obtained.

Further, when these crystals are esterified by such a lower alcohol as methanol or ethanol in the presence of a large amount of hydrogen chloride gas or sulfuric acid, a lower alcohol ester of optically inactive threo-$\beta$-p-methylsulfonylphenylserine may easily be obtained.

Optically inactive threo-$\beta$-p-methylsulfonylphenylserine obtained by the racemization is almost pure, and the trace of impurities, if necessary, may completely be removed by esterification. The thus obtained ester, as well as serine, is completely optically inactive, and by further optical resolution, the D-form can easily be obtained.

The process of the present invention, as described above, provides the industrially advantageous production of thiamphenicol from economical chemicals. Further, there has heretofore been no example of the optical resolution of DL-threo-$\beta$-p-methylsulfonylphenylserine ester in the thiamphenicol production. This has been done by the present inventors for the first time.

The present invention is described in detail by examples, as follows, but the scope of the present invention is not limited by these examples.

EXAMPLE 1

Step 1

To 250 ml. of methanol, 15 g. of glycine and 13.2 g. of 85% potassium hydroxide were charged to be dissolved, then 73.6 g. of p-methylsulfonylbenzaldehyde was added thereto, 20 g. of anhydrous potassium carbonate was added, and then the mixture was stirred for 30 hours at 10° C. The pH of the reaction mixture was adjusted to be 0.5 with 70 ml. of concentrated hydrochloric acid, and the methanol was distilled out under reduced pressure. To the residue, 150 ml. of water was added, and p-methylsulfonylbenzaldehyde separated was collected by filtration, washed and dried under reduced pressure. p-Methylsulfonylbenzaldehyde (36.3 g.) was recovered, M.P. 158°–159° C.

The filtrate was neutralized by ammonia water to the extent of the pH value thereof being 3–4 so as to precipitate 42 g. of white crystals of threo-p-methylsulfonylphenylserine, M.P. 213°–215° C.

*Elementary analysis* (as $C_{10}H_{13}O_5NS$). Calc'd (percent): C, 46.33; H, 5.05; N, 5.40. Found (percent): C, 46.24; H, 5.12; N, 5.31.

Step 2

To 38.8 g. of threo-$\beta$-p-methylsulfonylphenylserine, 250 cc. of 99% ethanol was added and while stirring, 38.8 g. of concentrated sulfuric acid was added dropwise thereto. After the completion of the addition, the reaction mixture was refluxed for 5 hours, and was cooled by ice water. The separated crystals were collected by filtration, and without drying, were dissolved in 400 cc. of water. To this aqueous solution, 19 g. of active carbon was added and filtered. The filtrate was neutralized by 10% aqueous sodium carbonate solution to pH 8. The separated crystals were collected by filtration, washed with water and dried under reduced pressure so as to give 34.4 g. of threo-$\beta$-p-methylsulfonylphenylserine ethyl ester (M.P. 125°–126° C.).

Step 3

In 30 ml. of methanol, 2.9 g. of DL-threo-p-methylsulfonylphenylserine ethyl ester was suspended and 1.5 g. of d-tartaric acid was added thereo. The suspension was refluxed while stirring for 30 minutes, and was stirred at room temperature for another 3 hours. The precipitated crystals were collected by filtration and washed with 10 ml. of methanol so as to give 2.1 g. of D-form ethyl ester-d-tartrate. M.P. 153°–154° C., $[\alpha]_D^{30}$ +3.3° (c.=20 water).

*Elementary analysis* (as $C_{12}H_{17}O_5NS \cdot C_4H_6O_6$). Calc'd (percent): C, 43.93; H, 5.30; N, 3.20. Found (percent): C, 44.02; H, 5.25; N, 3.23.

The thus obtained 2.1 g. of d-tartrate is dissolved in 20 ml. of water and is adjusted to pH 8 with 1.5 ml. of 28% ammonia water. After cooling, the precipitated crystals were collected by filtration and washed with water to obtain 1.2 g. of D-form ethyl ester, M.P. 140°–142° C. (decomposition), $[\alpha]_D^{20}$ +15° (c.=1 dioxane).

*Elementary analysis* (as $C_{12}H_{17}O_5NS$). Calc'd (percent): C, 50.17; H, 5.97; N, 4.88. Found (percent): C, 50.00; H, 6.03; N, 4.79.

L-threo-form ethyl ester (1.4 g.) was recovered by neutralizing the filtrate, from which the D-threo-form ethyl ester had been separated, according to manner similar to that mentioned above. M.P. 138° C., $[\alpha]_D^{20}$: —12° (c.=1, dioxane).

Step 4

To 200 ml. of ethanol, 11.5 g. of D-threo-$\beta$-p-methylsulfonylphenylserine ethyl ester obtained at Step 3, 1.6 g. of sodium borohydride and 3.8 g. of calcium chloride were charged, and the mixture was stirred for 12 hours at —20° C. After filtering the precipitates, the filtrate was concentrated under reduced pressure to obtain 13.8 g. of yellowish white powder of calcium salt of 1-p-methylsulfonylphenyl-2-amino-1,3-propane-diol-boron complex.

Step 5

The complex obtained at Step 4, without being isolated and purified, was suspended in 200 ml. of water, 3.3 g. of sodium cyanide was charged thereto, the temperature of the suspension was elevated to 30–40° C. and 42.2 g. of 23.8% aqueous chloral solution was added dropwise thereto in 30 minutes. After the addition, the mixture was stirred for 1 hour at 35–40° C., and the temperature was reduced to 10° C. or below. After adding 20 ml. of 2 N hydrochloric acid thereto, the precipitates were collected by filtration, washed with water and dried to give 12.1 g. of thiamphenicol, M.P. 164°–165° C., $[\alpha]_D^{25}$: +12.5° (c.=2 ethanol).

*Elementary analysis* (as $C_{12}H_{15}O_5NSCl_2$). Calc'd (percent C, 40.45; H, 4.81; N, 3.93; Cl, 19.90. Found (percent): C, 40.30; H, 4.95; N, 3.85; Cl, 19.75.

Step 6

To 28.7 g. of L-threo-$\beta$-p-methylsulfonylphenylserine ethyl ester, 300 cc. of water was added, and then 4.4 g. of sodium hydroxide was added. The mixture was stirred for 1 hour at room temperature to carry out hydrolysis. Subsequently, to the reaction mixture, 25.9 g. of DL-threo-$\beta$-p-methylsulfonylphenylserine was added and the pH value thereof was adjusted at 1 or less by concentrated hydrochloric acid. To the thus obtained solution, 6.1 g. of calcium chloride was added, then the pH of the solution was adjusted to 10 by concentrated ammonia water. Immediately thereafter this solution was heat-treated for 2 hours at 70° C., then cooled and neutralized by concentrated hydrochloric acid to pH 3. The precipitated crystals were collected by filtration and washed with water and with acetone to obtain 47.9 g. of optically inactive threo-$\beta$-p-methylsulfonylphenylserine (M.P. 218° C.). To these crystals, 300 cc. of 99% ethanol saturated with hydrochloric acid gas was added, and refluxed for 2 hours. After cooling, the resultant crystals were collected by filtration, and dissolved in water. Then the solution obtained was neutralized to pH 8 by ammonia water to give 37 g. of optically inactive threo-$\beta$-p-methylsulfonylphenylserine ethyl ester (M.P. 125° C.). This substance, as well as serine, is completely optically inactive.

EXAMPLE 2

The following procedures, in place of the procedure of optical resolution of Step 3 of Example 1, gave the same result as that of Example 1.

In 15 ml. of 95% ethanol, 2.9 g. of DL-threo-p-methylsulfonylserine ethyl ester was suspended and 1.5 g. of d-tartaric acid was added thereto. The suspension was refluxed under stirring for 30 minutes, and was stirred at room temperature for another 5 hours. The precipitated crystals were collected by filtration and washed with 10 ml. of 95% ethanol.

These crystals were dissolved in 20 ml. of water, and the pH of the thus obtained solution was adjusted to 8 by 4 ml. of 10% sodium hydroxide solution. The precipitated crystals were collected by filtration and washed with water. Amount obtained: 1.2 g., M.P.: 140°–142° C., $[\alpha]_D^{20}$: +15° (c.=1 dioxane).

Elementary analysis (as $C_{12}H_{17}O_5NS$). Calc'd (percent): C, 50.17; H, 5.97; N, 4.88. Found (percent): C, 49.97; H, 6.12; N, 4.75.

L-form ethyl ester-d-tartrate (2.3 g.) was obtained by concentrating under reduced pressure the filtrate from which the D-form ethyl ester-d-tartarate was separated.

EXAMPLE 3

The following procedure in place of the procedure of Example 1, Step 6, gave the result as that of Example 1.

In 300 ml. of water, 43.7 g. of d-tartarate of L-threo-β-p-methylsulfonylphenylserine ethyl ester was dissolved, then 15 g. of sodium hydroxide was added thereto, and the mixture was stirred for 1 hour at room temperature. This mixture was acidified by concentrated hydrochloric acid to pH 1 or less. To the thus obtained acidic mixture, 5.23 g. of magnesium chloride was added, and this mixture was treated in the same manner as in Example 1 to give 11 g. of optically inactive β-p-methylsulfonylphenylserine (M.P. 215–218° C.).

What we claim is:

1. A process for producing D-threo-1-p-methylsulfonylphenyl-2-dichloroacetamidopropane-1,3-diol, which comprises the steps of,
   (1) contacting 2 moles of p-methylsulfonylbenzaldehyde with 1 mole of alkali metal salt of glycine in an alcoholic solvent in the present of alkali metal carbonate, acidifying the reaction mixture to precipitate p-methylsulfonylbenzaldehyde, separating the precipitates by filtration, and then neutralizing the filtrate obtained with an alkali or ammonia so as to obtain threo-rich β-p-methylsulfonylphenylserine;
   (2) contacting the threo-β-p-methylsulfonylphenylserine obtained in the step (1) with a lower alcohol in the presence of an acid catalyst so as to obtain optically inactive threo-β-p-methylsulfonylphenylserine ester;
   (3) contacting the optically inactive threo-β-p-methylsulfonylphenylserine ester obtained in the step (2) with d-tartaric acid in a hydrous or anhydrous alcoholic solvent, to precipitate crystals of D-form ester-d-tartaric acid salt, separating the crystals by filtration from the reaction mixture containing L-form ester-d-tartaric acid salt, and, if desired, contacting the D-form ester-d-tartaric acid salt with an alkali to separate the D-form ester from the d-tartaric acid salt;
   (4) contacting the D-threo-β-p-methylsulfonylphenylserine ester or d-tartaric acid salt thereof obtained in the step (3) with sodium borohydride in an alcoholic solvent in the presence of calcium chloride to obtain calcium salt of D-threo-1-p-methylsulfonylphenyl-2-amino-1,3-propane-diol-boron complex;
   (5) contacting the calcium salt of D-threo-1-p-methylsulfonylphenyl-2-amino-1,3-propane-diol-boron complex obtained in the step (4) with an alkali metal cyanide and chloral in water to produce D-threo-1-p-methylsulfonylphenyl - 2 - dichloroacetamido-propane-1,3-diol, while;
   (6) contacting the reaction mixture obtained in the step (3) and containing L-threo-form-ester-d-tartaric acid salt, or an L-form threo-β-p-methylsulfonylphenylserine ester obtained by adding a basic substance to the reaction mixture obtained in the step (3), with water in the presence of an alkali or acid to obtain an aqueous mixture containing L-threo-β-p-methylsulfonylphenylserine, and heating the obtained mixture at a temperature of 30 to 150° C. after adjusting the pH thereof to a range of 8 to 11 inclusively, cooling the mixture, controlling the pH to 3–4 to precipitate optically inactive threo-β-p-methylsulfonylphenylserine, recovering the precipitated optically inactive threo-β-p-methylsulfonylphenylserine, and then recycling it to the esterification step (2).

2. A process for producing D-threo-1-p-methylsulfonylphenyl-2-dichloroacetamidopropane-1,3-diol, which comprists contacting D-threo - β - p-methylsulfonylphenylserine ester with sodium borohydride in an alcoholic solvent in the presence of calcium chloride to obtain calcium salt of D-threo-1-p-methylsulfonylphenyl - 2-amino-1,3-propane-diol-boron complex, contacting the calcium salt of D-threo-1-p-methylsulfonylphenyl - 2 - amino-1,3-propane-diol-boron complex obtained with an alkali metal cyanide and chloral in water to produce D-threo-1-p-methylsulfonylphenyl - 2 - dichloroacetamido-propane-1,3-diol.

3. A process for producing optically inactive threo-β-p-methylsulfonylphenylserine, which comprises contacting optically active threo - β - p - methylsulfonylphenylserine ester with water in the presence of an acidic or an alkaline substance to obtain an aqueous solution containing optically active threo-β-p-methylsulfonylphenylserine, and heating the thus obtained solution, after the pH is controlled to 8–11 inclusively, at a temperature of 30 to 150° C.

4. A process for producing D-threo-β-p-methylsulfonylphenylserine ester, which comprises the steps of,
   (1) contacting 2 moles of p-methylsulfonylbenzaldehyde with 1 mole of alkali metal salt of glycine in an alcoholic solvent in the presence of alkali metal carbonate, acidifying the reaction mixture to precipitate p-methylsulfonylbenzaldehyde, separating the precipitates by filtration, and then neutralizing the filtrate obtained with an alkali or ammonia so as to obtain threo-rich β-p-methylsulfonylphenylserine;
   (2) contacting the threo-β-p-methylsulfonylphenylserine obtained in the step (1) with a lower alcohol in the presence of an acid catalyst so as to obtain optically inactive threo-β-p-methylsulfonylphenylserine ester;
   (3) contacting the optically inactive threo-β-p-methylsulfonylphenylserine ester obtained in the step (2) with d-tartaric acid in a hydrous or anhydrous alcoholic solvent to precipitate crystals of D-form ester-d-tartaric acid salt, separating the crystals by filtration from the reaction mixture containing L-form ester-d-tartaric acid salt, and contacting the D-form-ester-d-tartaric acid salt with an alkali to separate the d-form ester from the d-tartaric acid salt; and
   (4) contacting the reaction mixture obtained in the step (3) and containing L-form-ester-d-tartaric acid salt, or an L-form threo-β-p-methylsulfonylphenylserine ester obtained by adding a basic substance to the reaction mixture obtained in the step (3), with water in the presence of an alkali or acid to obtain an aqueous mixture containing L-threo-β-p-methylsulfonylserine and heating the obtained mixture at a temperature of 30 to 150° C., after adjusting the pH to 8 to 11 inclusively, cooling the mixture, adjusting the pH to 3-4 to precipitate optically inactive threo-β-p-methylsulfonylphenylserine, recovering the precipitates of optically inactive threo-β-p-methylsulfonylphenylserine by filtration, and then recycling it to the esterification step (2).

5. A process for producing D-threo-1-methylsulfonylphenyl-2-dichloroacetamido-propane-1,3-diol, which comprises the steps, (1) contacting the threo-β-p-methylsulfonylphenylserine with a lower alcohol in the presence of an acid catalyst so as to obtain optically inactive threo-β-p-methylsulfonylphenylserine ester;

(2) contacting the optically inactive threo-β-p-methylsulfonylphenylserine ester obtained in the step (1) with d-tartaric acid in a hydrous or anhydrous alcohol solvent to precipitate crystals of D-form ester-d-tartaric acid salt, separating the crystals by filtration from the reaction mixture containing L-form ester-d-tartaric acid salt, and, if desired contacting the D-form-ester-d-tartaric acid salt with an alkali to separate the D-form ester from the d-tartaric acid salt;

(3) contacting the D-threo-β-p-methylsulfonylphenylserine ester or d-tartaric acid salt thereof obtained in the step (2) with sodium borohydride in an alcoholic solvent in the presence of calcium chloride to obtain calcium salt of D-threo-1-p-methylsulfonylphenyl-2-amino-1,3-propane-diol-boron complex; and (d) contacting the calcium salt of D-threo-1-p-methylsulfonylphenyl-2-amino-1,3-propane-diol-boron complex obtained in the step (3) with an alkali metal cyanide and chloral in water.

References Cited
UNITED STATES PATENTS

| | | | |
|---|---|---|---|
| 2,586,661 | 2/1952 | Jacob et al. | 260—562 |
| 2,718,521 | 9/1955 | Heywood | 260—562 |
| 2,740,809 | 4/1956 | Gregory | 260—470 X |
| 2,766,286 | 10/1956 | D'Amato et al. | 260—562 X |
| 2,839,577 | 6/1958 | Kollonitsch et al. | 260—562 X |
| 2,945,883 | 7/1960 | Alberti et al. | 260—562 |
| 3,012,073 | 12/1961 | Gregory | 260—470 X |

FOREIGN PATENTS 745,900    3/1956    Great Britain.

OTHER REFERENCES

Hajos et al., Acta. Chim. Hung., 17 449 (1958).

LORRAINE A. WEINBERGER, Primary Examiner

J. F. TERAPANE, Assistant Examiner

U.S. Cl. X.R.

260—462 R, 519, 462 C